SCHERMERHORN & PERRY.
Improvement in Apparatus for Purifying Milk.

No. 127,802.            Patented June 11, 1872.

Witnesses.            Inventors.

D. P. Howl            John M. Schermerhorn and Stuart Perry.
Edmund Masson            By their atty. A. B. Stoughton.

UNITED STATES PATENT OFFICE.

JOHN M. SCHERMERHORN, OF NORTH GAGE, AND STUART PERRY, OF NEWPORT, NEW YORK.

IMPROVEMENT IN APPARATUS FOR PURIFYING MILK.

Specification forming part of Letters Patent No. 127,802, dated June 11, 1872.

*To all whom it may concern:*

Be it known that we, JOHN M. SCHERMERHORN, of North Gage, Oneida county, and STUART PERRY, of Newport, in the county of Herkimer, both in the State of New York, have invented certain new and useful Improvements in Apparatus for Filtering and Forcing Filtered Air into and through Milk to purify said milk; and that the following is a full, clear, and exact description of the same, reference being had to the accompanying drawing making a part of this specification, in which—

Figure 1:
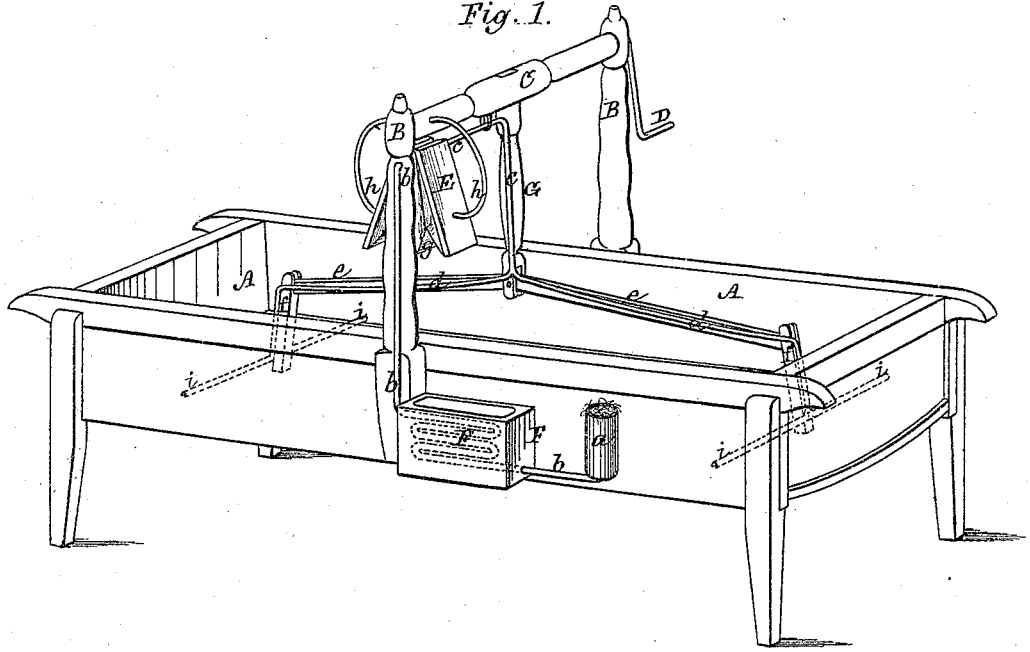
Figure 2:
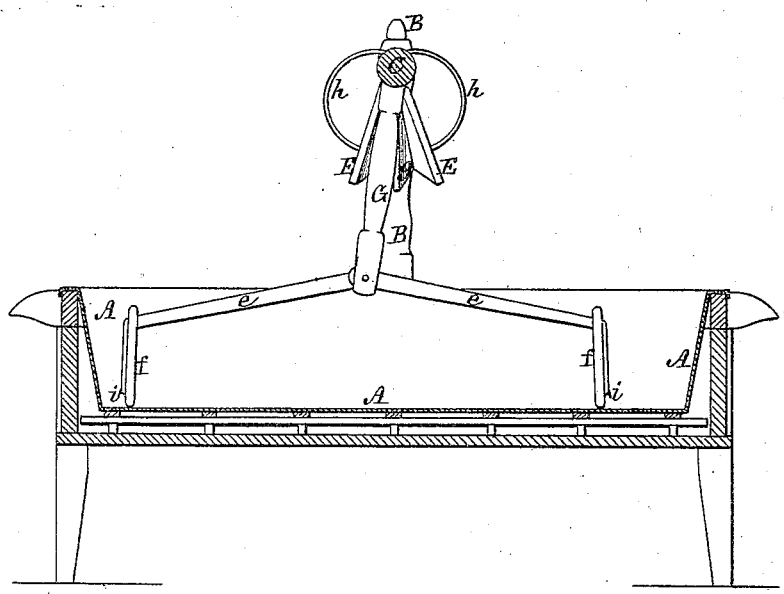

Figure 1 represents, in perspective, the apparatus with its appliances for filtering and forcing the filtered air into the milk. Fig. 2 represents a longitudinal vertical section through the same.

Similar letters of reference, where they occur in the separate figures, denote like parts in the drawing.

We are aware that atmospheric air has been blown into and through milk to purify the milk, and that such air has been cooled before it was so blown or forced into the milk; but we are not aware that any one, prior to our invention or discovery, filtered and purified the air itself before it was so forced into or through the milk; and our invention consists in appliances by which the air is first forced through some porous material having the characteristics of wool or sponge, so as to divest the air of all and any impurities it may contain before it is forced into or mingled with the milk that it is, in turn, to purify and divest of its noxious taste and gases; and our invention further consists in the appliances by which we get the forced current of air at the same time and by the same power that agitates the milk in the vat or other vessel that contains it, or by which it is carried or transported.

To enable others skilled in the art to make and use our invention, we will proceed to describe the same with reference to the drawing.

A represents a milk-vat, such as one commonly used at cheese-factories for containing milk. To apply our invention to such a vat pillars B B are attached to the stand or frame, in which a rock-shaft, C, is supported, and which may be operated by a crank, D. On the side of the vat there is a receptacle, *a*, for containing wool, cotton, sponge, or other similarly porous material, through which air can be drawn or forced, and so deprive said air of any and all impurities which it may contain. From this receptacle *a* a pipe or tube, *b*, extends to a bellows, E, arranged on, so as to be operated by, the rock-shaft C, and said pipe or tube *b*, in its transit from the receptacle *a* to the bellows E, may be formed into a coil and pass through a box, F, for containing ice or other cooling material, so as to cool the air carried through the pipe or tube. From the bellows E there extends another air-pipe or tube, *c*, which is supported by a down-hanger, G, attached to the rock-shaft C, and which connects with two branch-pipes or tubes, *d*, which may be flexible ones, and which extend out along the stirrer-arms *e f*, and terminate in a spreader or disseminator, *i*, at the ends of said arms and close to the bottom of the vat, so that the purified air may be brought from the purifier *a* and forced into and through the milk in the vat.

This construction is very convenient for a portable vat, as all the appliances to operate it (being attached to) are carried around with it.

The bellows E, as shown in the drawing, is a double-acting one, the central member *g* of which is stationary, but the side members movable, and controlled by springs *h h* extending from the shaft C and bearing against them. The condition of these members may be reversed without changing the result—viz., by making the central member the moving one and the side members stationary. And when other power cannot conveniently be had the bellows or air-pump is worked by hand.

Having thus fully described our invention, what we claim therein as new, and desire to secure by Letters Patent, is—

In combination with the milk-vat or can A and an air-supplying mechanism for forcing air through the milk therein, the receptacle *a* for containing a filtering medium, substantially such as described, through which the air is supplied to divest it of its impurities, as described and represented.

JOHN M. SCHERMERHORN.
STUART PERRY.

Witnesses:
WM. GETMAN,
FRANK L. HOFFMAN.